United States Patent Office 3,380,848
Patented Apr. 30, 1968

3,380,848
METHOD OF PRODUCING SOLID POLYMERIC MATERIAL HAVING BACTERICIDAL PROPERTIES
Carl Horowitz, Brooklyn, N.Y., assignor to Polymer Research Corporation of America, Brooklyn, N.Y., a corporation of New York
No Drawing. Filed May 27, 1964, Ser. No. 370,725
7 Claims. (Cl. 117—113)

ABSTRACT OF THE DISCLOSURE

This invention relates to the production of polymeric materials having bactericidal properties, including materials such as natural or synthetic polymers, e.g. cellulose, cotton, paper, leather, rubber, nylon, polyesters, polypropylene, etc. This is accomplished according to the invention by contacting the solid polymeric material with the reaction mixture formed by reacting an alkali metal hydroxide with an aqueous solution of silver nitrate. Under the influence of the reactants the substrate turns a brown color due to colloidally dispersed, bactericidally active silver oxide formed in situ. The bactericidal activity is permanent and the silver oxide lodged in the substrate is substantially insoluble.

It is a primary object of the present invention to provide solid polymeric bodies which have and retain bactericidal properties.

It is another object of the present invention to provide bristles or bristle-like bodies of natural or synthetic material which are made to have and retain bactericidal properties.

It is yet another object of the present invention to provide a method of rendering bactericidal, bodies of the above type and of other bodies as of cotton fabric, of nylon, Dacron, Arnel, polypropylene, paper, leather, rubber, etc.

Other objects and advantages of the present invention will be apparent from a further reading of the specification and of the appended claims.

With the above and other objects in view, the present invention mainly comprises a body of solid polymeric material having dispersed therein and distributed throughout at least a surface layer thereof, bodies of silver oxide. Said silver oxide remains dispersed and distributed in the polymeric body and has a permanent bactericidal activity against both gram positive and gram negative bacteria.

The method of the present invention mainly comprises the reacting of a silver nitrate solution with an alkali metal solution and then immersing the polymeric body in the resulting reaction mixture so as to cause dispersement of silver oxide in the surface of the polymeric body.

The invention is of particular importance in the case of bristles which are used in contact with an animal or human body, such as combs, hair brushes, toothbrushes and the like. The method may be used to cause the embedding and distribution of silver oxide in bristles of animal origin, plant origin or synthetic bristles. Materials of all of these types are meant to be comprehended within the meaning of "polymeric material." Thus, for example, the method of the invention can be carried out on animal hair bristles, cellulosic bristles, vinyl bristles, nylon bristles, etc.

The method is preferably carried out by mixing a dilute aqueous silver nitrate solution, e.g. 0.01–5% silver nitrate with a dilute aqueous alkali metal hydroxide solution, e.g. 0.05–5% sodium hydroxide, potassium hydroxide or lithium hydroxide. The mixture of the two solutions is preferably heated up to about 95° C. In practical carrying out of the method, silver nitrate solution is heated to about 95° C., and then the alkali metal hydroxide solution is added until a permanent slight cloudiness occurs. At this point the selected body of polymeric material, e.g. nylon bristles are immersed in the liquid, and while mixing kept therein at the same temperature or heated slightly to just below the boiling point for about 15 minutes to 1 hour, until the body acquires a permanent light brown to golden color.

This color remains even after repeated washings and is permanent throughout the body of the bristle as can be seen on cross-section of the filament.

The color is due to silver oxide dispersed in the polymer in much the same manner as dispersed dyes are absorbed by the substrate. Bristles treated in this manner exhibit permanent bactericidal activity against gram positive and gram negative bacteria even after hundreds of actual usages in a toothbrush or hair brush, with or without water. The silver oxide, the presence of which is evidenced by the golden-brown color, is not removed by ordinary liquids in daily use, such as water, toothpaste, saliva, etc.

The following examples are given to further illustrate the present invention. The scope of the invention is not, however, meant to be limited to the specific details of the examples.

Example 1

1000 cc. of demineralized water containing 1 g. of silver nitrate are heated to 95° C., and 1% aqueous sodium hydroxide solution is added thereto in an amount sufficient to result in a permanent slight cloudiness (about 3 cc.).

50 grams of nylon toothbrush bristles are placed therein and while maintaining the temperature and mixing are kept therein for 30 minutes. The bristles become golden colored, are rendered bactericidal. The color and bactericidal activity remains even after hundreds of usages.

Example 2

1000 cc. of demineralized water containing 1 g. of silver nitrate are heated to 95° C., and 1% aqueous sodium hydroxide solution is added thereto in an amount sufficient to result in a permanent slight cloudiness (about 3 cc.).

50 grams of horsehair brush bristles are placed therein and while maintaining the temperature and mixing are kept therein for 30 minutes. The bristles become golden colored, are rendered bactericidal. The color and bactericidal activity remains even after hundreds of usages.

Example 3

1000 cc. of demineralized water containing 1 g. of silver nitrate are heated to 95° C., and 1% aqueous sodium hydroxide solution is added thereto in an amount sufficient to result in a permanent slight cloudiness (about 3 cc.).

50 grams of cellulosic bristles are placed therein and while maintaining the temperature and mixing are kept therein for about 15 minutes. The bristles become golden colored, and are rendered bactericidal. The color and bactericidal activity remains even after hundreds of usages.

Example 4

A sample of 50 g. of cotton fabric is immersed in solution as per Example 1 and maintained there for 10 minutes. A light brown colored fabric of permanent bactericidal properties results.

Example 5

Same as Example 4 except that a sample of 50 g. of synthetic fabric such as nylon, Dacron, Arnel and polypropylene is used. The same permanently bactericidal fabric results.

Example 6

A sample of paper is immersed for five minutes at room temperature in a solution as per Example 1. Another sample of paper is sprayed with the solution. After they are dried, both samples of paper are strongly bactericidal against gram negative and gram positive bacteria.

Example 7

A sample of 50 g. of leather is immersed in the solution as per Example 1 at 40–50° C. for 10 minutes. A permanently bactericidal, light tan colored leather results. The bactericidal property does not wash out after many washings in soap and water and after prolonged wear.

Example 8

The solution as per Example 1 is heated to 50° C. and 50 g. of rubber goods such as sheet of natural gum rubber and a film of natural latex are placed in the solution for 10 minutes. After washing, a permanently bactericidal rubber sheet results.

In place of the above-mentioned articles, finished objects can be used such as rubber gloves, leather gloves or shoes; cotton, nylon or Dacron propective coats (such as nurses' or surgeons' coats), hospital linens or drapes, leather chairs, wooden objects, telephone receivers, wrapping paper, plastic or wooden toys, women's stockings, etc.

If a white or colorless article is absolutely desired, the following procedure can be used in addition to the one mentioned above.

Example 9

10 g. hydroxyethylmethacrylate
1000 cc. water
5 g. ammonium persulfate dissolved in 30 cc. of water Samples treated as per Examples 1–8 are immersed in the above solution and left overnight, or in order to speed up the reaction the solution with the samples inside can be heated on waterbath at 50–70° C. for 15 minutes. Completely white or colorless objects result, which are permanently bactericidal.

During this step a polymerization takes place with silver oxide-forming radicals in presence of ammonium persulfate. The radicals initiate polymerization and grafting of hydroxyethylmethacrylate and attach themselves to polymer giving a permanently bactericidal and not discolored object.

Although the present invention has been described in some detail by way of illustration and example for purposes of clarity and understanding, it is understood that certain changes and modifications may be made within the spirit of the invention and scope of the appended claims.

What is claimed as new and desired to be secured by Letters Patent is:

1. The method which comprises reacting a dilute alkali metal hydroxide solution with a dilute aqueous solution of silver nitrate at a sufficiently high reaction temperature to cause cloudiness to develop, thus forming a reaction mixture including silver oxide, and bringing said reaction mixture in intimate contact with a solid body of polymeric material at said reaction temperature whereby the silver oxide becomes dispersed and embedded in said material and thus renders the same bactericidal.

2. Method according to claim 1, in which said solid body of polymeric material is nylon bristle.

3. Method according to claim 1, in which said solid body of polymeric material is horsehair bristle.

4. Method according to claim 1, in which said solid body of polymeric material is cellulosic bristle.

5. Method according to claim 1 wherein the concentration of said alkali metal hydroxide solution is between about 0.05–5% and wherein the concentration of said aqueous silver nitrate solution is between about 0.01–5%.

6. Method according to claim 5 wherein the reaction temperature is about 95° C.

7. Method according to claim 6 wherein the reaction mixture in contact with said solid body of polymeric material is maintained at a temperature just below the boiling point for about 15 minutes to one hour.

References Cited

UNITED STATES PATENTS

| | | | |
|---|---|---|---|
| 1,043,646 | 11/1912 | Turner. | |
| 1,764,417 | 6/1930 | Satow | 167—72 X |
| 2,304,478 | 12/1942 | Rosenzweig | 117—138.5 X |
| 2,396,515 | 3/1946 | Kreidl et al. | 167—72 X |
| 2,459,897 | 1/1949 | Schwarz | 167—14 X |
| 2,521,713 | 9/1950 | Goetz | 167—14 |
| 2,653,893 | 9/1953 | Romans | 167—72 X |
| 2,785,106 | 3/1957 | Mendelsohn | 167—84 |
| 3,184,376 | 5/1965 | Degoli | 167—14 |

JOSEPH SCOVRONEK, *Primary Examiner.*